United States Patent [19]

Kuckes

[11] Patent Number: 4,791,373

[45] Date of Patent: Dec. 13, 1988

[54] SUBTERRANEAN TARGET LOCATION BY MEASUREMENT OF TIME-VARYING MAGNETIC FIELD VECTOR IN BOREHOLE

[76] Inventor: Arthur F. Kuckes, 508 N. Aurora St., Ithaca, N.Y. 14850

[21] Appl. No.: 916,755

[22] Filed: Oct. 8, 1986

[51] Int. Cl.⁴ .......................... G01V 3/11; E21B 7/04; E21B 47/022

[52] U.S. Cl. ...................................... 324/346; 33/304; 166/66.5; 175/45; 324/207

[58] Field of Search ............... 324/323, 346, 356, 369, 324/207, 208; 166/65 M, 250, 254; 175/40, 45, 50; 73/152; 364/422; 33/302, 304, 313

[56] References Cited

U.S. PATENT DOCUMENTS

| | | |
|---|---|---|
| 2,199,367 | 4/1940 | Athy et al. |
| 2,521,745 | 6/1949 | Pope |
| 2,524,360 | 12/1946 | Russell ................................ 324/346 |
| 2,599,687 | 4/1949 | Brant |
| 2,656,505 | 5/1949 | Hewitt, Jr. |
| 2,723,374 | 11/1955 | Williams |
| 3,100,350 | 7/1960 | Brown .................................... 33/313 |
| 3,256,480 | 6/1966 | Runge et al. |
| 3,282,355 | 11/1966 | Henderson |
| 3,285,350 | 11/1966 | Henderson |
| 3,305,771 | 2/1967 | Arps |
| 3,369,174 | 2/1968 | Groenendyke et al. |
| 3,406,766 | 10/1968 | Henderson |
| 3,479,581 | 11/1969 | Runge |
| 3,488,574 | 1/1970 | Tanguy |
| 3,697,864 | 10/1972 | Runge |
| 3,701,007 | 10/1972 | Schad |
| 3,712,391 | 1/1973 | Coyne |
| 3,722,605 | 3/1973 | Isham .................................... 175/40 |
| 3,725,777 | 4/1973 | Robinson et al. |
| 3,731,752 | 5/1973 | Schad |
| 3,745,446 | 7/1973 | Norris |
| 3,778,701 | 12/1973 | Runge |
| 3,907,045 | 9/1975 | Dahl et al. |
| 3,984,758 | 10/1976 | Millon |
| 4,016,942 | 4/1977 | Wallis, Jr. et al. .................... 175/45 |
| 4,021,774 | 5/1977 | Asmundsson et al. |
| 4,072,200 | 2/1978 | Morris et al. |
| 4,163,324 | 8/1979 | Russell ........................ 33/313 |
| 4,323,848 | 4/1982 | Kuckes |
| 4,361,192 | 11/1982 | Trowsdale ...................... 33/313 X |
| 4,372,398 | 2/1983 | Kuckes |
| 4,443,762 | 4/1984 | Kuckes |
| 4,502,010 | 2/1985 | Kuckes |
| 4,510,696 | 4/1985 | Roesler ............................... 33/304 |
| 4,529,939 | 7/1985 | Kuckes |
| 4,700,142 | 10/1987 | Kuckes .............................. 324/346 |

OTHER PUBLICATIONS

"Magnetostatic Methods for Estimating Distance and Direction From a Relief Well to a Cased Wellbore", by J. D. Robinson & J. P. Vogiatzis, pp. 741–749, Journal of Petroleum Technology.

"An Electromagnetic Survey Method for Directionally Drilling a Relief Well Into a Blown Out Oil or Gas Well", Society of Petroleum Engineers Journal, Jun. 1984, pp. 269–274.

"Successful ELREC Logging for Casing Proximity in an Offshore Louisiana Blowout", Society of Petroleum Engineers of AIME, SPE 11996, 10/1983.

"Drilling by Direction", by Sandford Brown, The Lamp, Fall 1984, vol. 66, No. 3.

"Magnetic Well Logging", by Broding et al, pp. 1–26, Geophysics, vol. XVII, Jan. 1952, No. I.

Primary Examiner—Reinhard J. Eisenzopf
Assistant Examiner—Warren S. Edmonds
Attorney, Agent, or Firm—Jones, Tullar & Cooper

[57] ABSTRACT

A method of locating, from a relief well, a target borehole of a deep well at a substantial distance below the earth's surface, while approaching the target borehole at a large angle of intersection. A homing tool incorporating a magnetic field sensor having its axis of maximum sensitivity parallel to the axis of the relief well detects an A.C. magnetic field produced by alternating current in the target borehole to provide the data required for directing further drilling of the relief well.

7 Claims, 3 Drawing Sheets

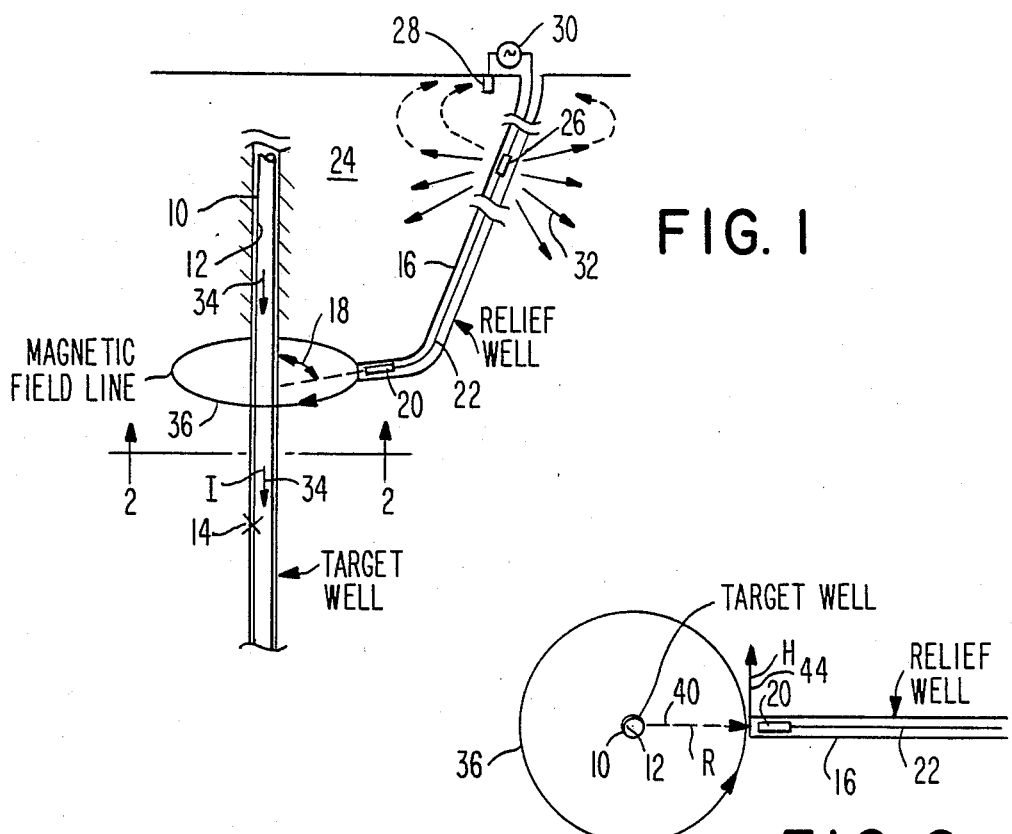
FIG. 1
FIG. 2
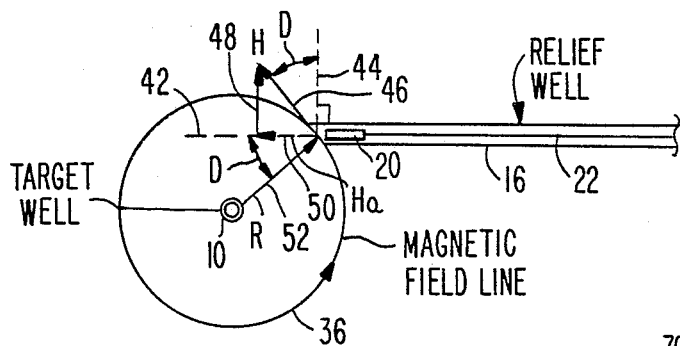
FIG. 4
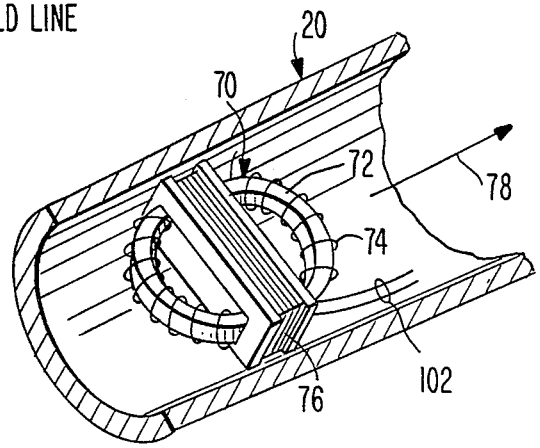
FIG. 5

SUBTERRANEAN TARGET LOCATION BY MEASUREMENT OF TIME-VARYING MAGNETIC FIELD VECTOR IN BOREHOLE

BACKGROUND OF THE INVENTION

The present invention relates, in general, to a method and apparatus for locating the borehole of a deep well at a substantial distance below the earth's surface, and more particularly, to a method and apparatus for locating such a well bore from a relief well which is approaching the target well bore at a large angle of intersection.

It is well known that in drilling deep wells for oil and gas exploration, precise control of the path followed by the well is extremely difficult, so that it is virtually impossible to know the exact location of the well at a given depth. For example, a drilling tolerance of plus or minus one-quarter of a degree will allow the bottom of a 10,000 foot well to be positioned anywhere within a circle 100 feet in diameter, and numerous factors can increase this deviation. This is not of particular concern in normal drilling operations, but if an accident should occur, such as a rupture in the casing of the well which causes the well to blow out, it may become necessary to plug the well at or below the point of the rupture to bring it under control. In order to do this, a relief well must be drilled to intersect the original well at the desired level. Since such blow-outs produce extremely hazardous conditions at the earth's surface in the vicinity of the original well head, the relief well must be started a considerable distance away and drilled at an incline in order to protect the personnel and the equipment used.

Because the same problems of control of the direction of drilling are ncountered in the relief well as were encountered in the original well, the location of the relief well bore cannot always be determined with precision; accordingly, it is extremely difficult to determine the distance and direction from the relief well to the blown out well with sufficient accuracy to insure that the relief well will intersect with the target well. A further difficulty is that in some cases the force of the explosion resulting from the rupturing of a well casing can do so much damage at the surface that it may be difficult to say exactly where the well head is, much less where the well is located at the depths of 10,000 feet or more. In addition, the relief well often is started one-half mile or more away from the area of the original well head, because of the conditions there, and is angled toward the original well until it approaches relatively closely. Then the relief well may be caused to angle downwardly to follow along the original well to the location where the two wells are to intersect. Thus, the relief well usually is very complex, compounding the problem of knowing exactly where it is located with respect to the original well.

A further difficulty is encountered when it is desired to drill the relief well so that it intersects with the target well at a large angle of intersection. This occurs, for example, when the point of intersection at the target well is to be relatively shallow so that the relief well must approach it in a generally horizontal direction. In such cases, the relief well approaches the target well very quickly, and can easily by-pass the target if an accurate measurement of direction is not obtained, or can intersect it unexpectedly if an accurate measurement of distance is not available.

Numerous attempts have been made to provide accurate measurements of well location, and many surveying techniques are available which can give general information as to the location of a relief well with respect to a target well. However, such survey techniques are not capable of providing accurate data concerning the relationship of the relief well to the original, or target well, when there is a high angle of approach.

The art of electrical well logging is highly developed, and various systems have been successfully used in the past in locating geologic anomalies of certain types, but these systems have been less than satisfactory in guiding relief well bores to locate and intersect existing boreholes. Many of the difficulties encountered in such prior systems were overcome by the methods and apparatus disclosed in U.S Pat. Nos. 4,323,949 and 4,372,398 of Arthur F. Kuckes, the disclosures of which are incorporated herein by reference. In accordance with the '398 patent, an alternating electric current flow is produced in the casing of a target well, or borehole, by injecting a current into the earth surrounding the target well. Preferably, an electrode located in the relief borehole is used, this electrode being carried by the logging cable and contacting the uncased sides of the relief borehole so that a current flow is established in the vicinity of the relief hole. This current flow extends between the downhole electrode and a second electrode which, in a preferred form of the invention, is located at the earth's surface in the vicinity of the head of the relief well. The relief well is uncased, so the injected ground current finds a path of least resistance through the casing or other current-conducting material in the target borehole, and the resulting concentration of current produces an alternating magnetic field surrounding the target well which can be detected by an A.C. field sensor mounted in a sensor tool, as described in the '848 patent. The sensor disclosed in the '848 patent is extremely sensitive to very small magnetic fields, and permits an accurate detection of currents flowing in borehole casings located a considerable distance away from the relief borehole. The current generated in the target borehole casing is an alternating current of relatively low frequency which produces a characteristic magnetic field that can be detected and which produces a corresponding output signal from the A.C. magnetic field sensor. The signal produced by the A.C. magnetic field sensor provides a measure of the direction and distance to the target well casing.

In the course of drilling a relief well, A. C. magnetic field measurements are taken periodically at selected depths, and the resulting measurements, when taken with simultaneous measurements of the earth's static magnetic field to provide a stable reference point for orientation of the A.C. field sensor, will, in accordance with U.S. Pat. No. 4,372,398, permit periodic calculations of the presumed location of the target well with respect to the location of the A.C. magnetic field sensor in the relief well. This information is used to guide further drilling of the relief well. As the relief well approaches a desired depth, its approach to the location of the target well can be guided by the output of the sensor tool so that the target well is intersected at the desired depth below the earth's surface in a rapid and effective manner, without ambiguity, and with resulting savings in the cost of drilling the relief well.

Although the method and apparatus set forth in the '398 and '848 patents were found to be extremely effective, it was found that the need to detect and measure the earth's magnetic field in order to establish the location and orientation of the sensor within the relief well introduced errors, in some situations, for when the earth's magnetic field becomes distorted or difficult to measure, the results became unreliable. More specifically, in accordance with the '398 patent, a measurement of the two vector components of the earth's magnetic field lying in the plane perpendicular to the axis of the sensor was required in order to obtain a complete specification of the sensor orientation in space so as to be able to determine the precise direction of the target well from the data received by the A.C. magnetic field sensor. It was found, however, that this method of orientation was imprecise in situations where the borehole axis nearly coincided with the earth's magnetic field lines and further, if the earth's magnetic field was perturbed by ferromagnetic effects around the relief or target well, the determination of sensor orientation could be faulty.

The foregoing difficulties were overcome in accordance with the invention set forth in U.S. Pat. No. 4,700,142, of Arthur F. Kuckes, wherein sensor orientation is obtained by making measurements of the inclination and direction of the relief well from conventional borehole survey data; then the rotational orientation of the A. C. field sensor tool within the relief well is determined by means of a gravity measurement obtained, for example, by means of vector accelerometers. Taken with the data concerning the slope and direction of the relief borehole, the accelerometer output permits a precise determination of the orientation of the sensor tool and thus permits a determination of the direction and distance of the target from the relief well sensor, without the need to measure the earth's magnetic field.

However, if the relief well approaches the target well at a large angle, for example, between 60° and 90° of the axis of the target well, it becomes very difficult to obtain meaningful and accurate data, since the A.C. sensors, which are perpendicular to the axis of the sensor tool, then will lie in a plane which approaches being parallel to the axis of the target well. Since the essential A.C. signal information lies in a direction which approaches being perpendicular to the sensor plane, or parallel to the axis of the relief well borehole, it becomes very difficult to produce the required analysis of the received data and to determine the direction of the target well with accuracy and precision. Thus, an improved apparatus and method for providing an accurate and reliable measurement of the direction and distance to a target well from a relief well approaching at a high angle of intersection is needed.

SUMMARY OF THE INVENTION

It is, therefore, an object of the present invention to provide an apparatus and method for measuring the distance and direction to a target well from a relief well when the relief well is approaching the target at a high angle of intersection.

It is a further object of the present invention to provide an apparatus and method for measuring the distance and direction from a sensor tool to a target well accurately, reliably, and simply in situations where a relief well containing a sensor tool is nearly perpendicular to the axis of a target well.

Briefly, the present invention is directed to the provision of an apparatus and method for high incident angle measurements of the distance and direction from an A.C. magnetic field sensor in a relief well to a target well carrying an alternating current. More particularly, the invention is directed to a well homing tool wherein an alternating current flow is excited in a target well, and an A.C. field sensor located in a homing sensor tool within a relief well approaching the target at a high angle of incidence provides a measure of the A.C. magnetic field produced by that current flow. Since the essential A.C. field signal information is in the component of that signal which is parallel to the relief borehole in the case of a large angle of intersection, the measurement of the A.C. signal can be accomplished by means of a single alternating magnetic field sensor having its axis of maximum sensitivity aligned with the axis of the well homing tool, and thus aligned with the axis of the relief well when measurements are to be made. Since the measurement is being made of the axial component of the A.C. field in a relief well at the location of the sensor, and since the inclination and direction of the relief well bore can be accurately determined by conventional well logging techniques, it is not necessary to determine the orientation of the homing tool within the relief well.

When a relef well is drilled toward a target well at a large angle of approach, the relief well is essentially perpendicular tot he generally vertical target well, and the only guidance information needed by the driller is whether the relief well must be turned to the right or to the left in order to intersect the target well. The relief well will move in a generally horizontal plane, so vertical directionality is not a consideration. A large angle of approach may occur when the relief well, which starts at a large distance away from the target well head, is required to intersect at a relatively shallow depth, and in such situations, the relief well tends to intersect the relief wellat between about 60° and 90°. Further, even in non-shallow well situations, there are a significant number of cases where the relief well driller would like to have a large angle of intersection, or even a perpendicular intersection.

When a straight relief well is on course to intersect a straight target well, the A.C. magnetic field generated by alternating current flow on the target well is perpendicular to the axis of the relief well, and there will be no component of the A.C. field in the direction of the sensor tool axis. As a corollary to this, when a straight relief well is not on target, i.e., is directed toward one side or the other of a straight target well, the magnetic field produced by current in the target willnot be perpendicular to the relief well axis, and there will be a componenet of that field lying along the relief well axis. In accordance with the present invention, a single A.C. magnetic field sensor is located on a homing tool in the relief well with its axis of maximum sensitivity parallel to the axis of the tool, and thus parallel to the axis of the well. This magnetic field sensor is capable of detecting any field components which are parallel to the axis of the relief well. When the relief well is exactly on target, the axes of the homing tool and the relief well will intersect the axis of the target well, and there will be no A.C. magnetic field component parallel to the axis of the relief well or of the homing tool sensor. However, if the relief well deviates, away from the target, a corresponding component of the alternating magnetic field appears in a direction axial to the sensor tool, and can be detected by the sensor. When the homing tool is off target to one side of the target well, the sensor axial component is in phase with the current flow on the target well. If the relief well is off target to the other direction, then the sensor axial component will be 180° out of phase with the current flow in the target well. This sensor axial component is measured by the single A.C. magnetic field sensor located on the homing tool, with the magnitude of the axial component being proportional to the degree of deviation of the relief well from the target, and the phase of the component indicating whether the target is to the left or to the right of the axis of the relief well. This information is then used to redirect the relief well toward the target, without the need for orienting the homing tool in the relief well, and thus without the need for measurements of either the earth's magnetic field or of gravity.

It is noted that in a preferred form of the invention, one of the electrodes used to generate a current flow in the target well is located in the relief well. The ground current produced by the electrode in such a relief well normally does not generate a net magnetic field at any point in the relief well, because of the symmetry of the generated field. However, small anomalies in the earth can disturb the electrode current, so it is desirable to place the electrode sufficiently far from the sensor in the homing tool to insure that this ground current does not adversely affect the measurement of the horizontal field produced by the current flow in the target well and detected at the sensor. This is important, because the relief well may deviate from the perpendicular with respect to the target well by only a small amount, so that the component of the alternating magnetic field to be measured by the sensor may be quite small. However, this axial component of the alternating magnetic field can be measured with great accuracy when there is appropriate spacing between the sensor and the electrode, so that the distance and direction to the target well can be accurately determined by a single sensor when there is a high angle of incidence between the two wells.

BRIEF DESCRIPTION OF THE DRAWINGS

The foregoing and additional objects, features and advantages of the present invention will become apparent from a consideration of the following detailed description of a preferred embodiment thereof, taken in conjunction with the accompanying drawings, in which:

FIG. 1 is a diagrammatic elevational view illustrating the relationship between a target well, a relief well, and the alternating magnetic field generated by a current on the target well, with the relief well approaching the target well at a large angle of intersection, and on target;

FIG. 2 is a diagrammatic bottom plan view of the relief well of FIG. 1, taken on line 2—2 of FIG. 1;

FIG. 4 is a diagrammatic bottom plan view of the relief well and target well of FIG. 3, taken along line 4—4 of FIG. 3;

FIG. 5 is a partial, perspective cross-sectional view of a homing sensor tool having a magnetic field sensor with its axis of maximum sensitivity aligned with the axis of the tool;

DESCRIPTION OF PREFERRED EMBODIMENT

Figure 3:
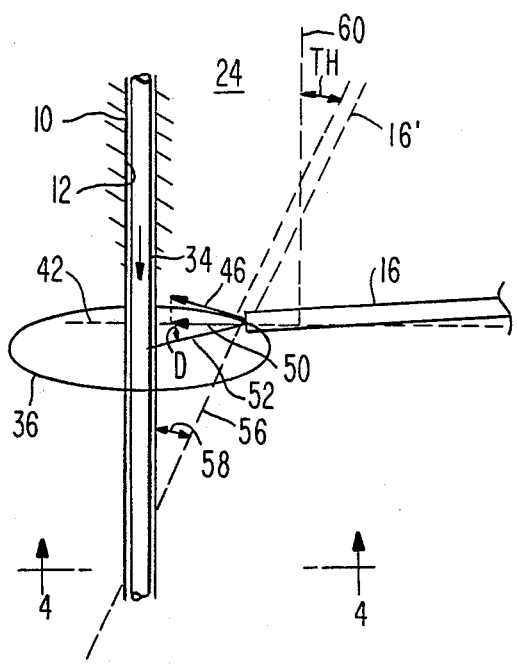
FIG. 3 is a diagrammatic elevational view of a relief well approaching a target well off target.
Figure 6:
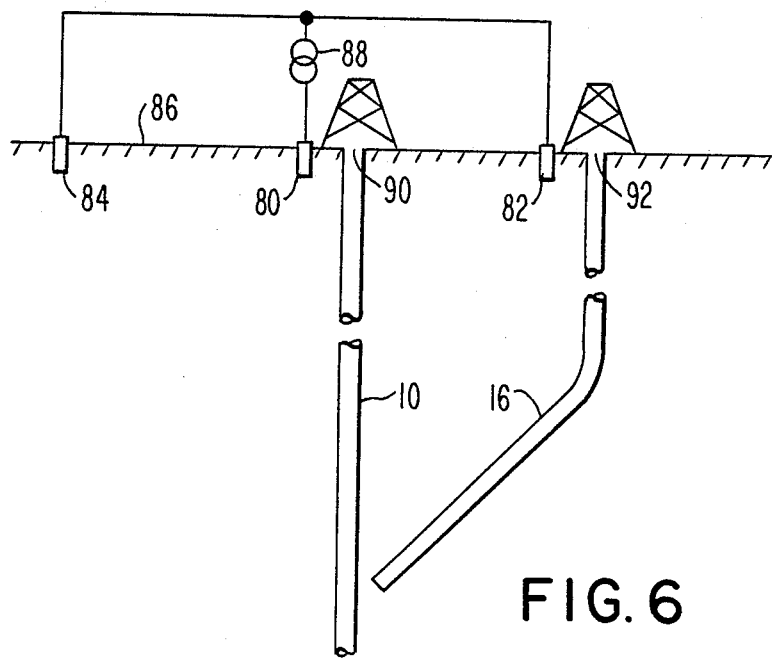
FIG. 6 is a diagrammatic illustration of an alternative electrode configuration.

The borehole locating method and apparatus of the present invention is generally illustrated in FIG. 1, wherein a target well 10 is illustrated. This well represents, for example, a gas well having a steel casing which is ruptured at an area 14, which may be at any depth. Since such a rupture can be dangerous, it is necessary to inject a cement plug in the well, and in order to do this, a relief well, generally indicated at 16 is drilled in such a way that the relief well intersects the target well 10 so that the target can be plugged by material fed down the relief well.

Although FIG. 1 illustrates the wells 10 and 16 as being relatively straight, in reality such wells are more complex, since the direction a drill moves through the earth cannot be precisely controlled. Both wells are subject to the same control problems and since the relief well must be started at a safe distance from the well head of the target well 10, the relief borehole 16 must be drilled at complex angles which will cause the relief well to travel down for a distance and then curve toward an intersection with the target well at its assumed location. Although in most cases, it is desirable to have the relief well curve downwardly again as it approaches the target well 10, so that the relief well travels parallel to the target well for a distance, this is not always possible, particularly if the relief well is to intersect the target at a relatively shallow depth. In such a case, there may not be a sufficient depth available to curve the relief well downwardly as it approaches the target well, so that the relief well must intersect the target at a large angle of intersection 18. In addition, even at deeper locations drillers occasionally desire to approach the target well at a large angle, for a variety of reasons. Since the same drilling error exists for the relief well as existed for the original well, not only is the exact location of the target unknown, but in addition the exact location and direction of the end of the relief well may vary significantly from the desired location and direction.

For the initial drilling of the relief well 16, conventional surveying techniques provide a satisfactory guide to the drillers, but as the relief well approaches to within 150 to 200 feet of the target, more accurate measurements are required. Accordingly, as the relief well is drilled, the drilling tool is periodically withdrawn from the relief borehole 16 and a magnetic field detecting homing tool 20, which is secured to a conventional well logging wire line 22, is lowered down the borehole 16 by means of conventional well logging equipment at the surface.

The homing tool 20 incorporates a magnetic field sensor, to be described, which senses a magnetic field produced by current flow in the steel casing 12 of the well 10, or by current flow in other electrically conductive material within the well, such as a drill string. This current flow is produced by current injected into the earth 24 surrounding the wells by means of suitable electrodes such as those illustrated at 26 and 28, and those more fully described in U.S. Pat. No. 4,372,398. Current is supplied to the electrodes 26 and 28 by means of, for example, an A.C. source 30, producing a ground current 32 which flows essentially symmetrically from the relief borehole 16, the symmetry of the current paths depending upon the conductivity of the surrounding geological formations. Because of this symmetry, the magnetic field produced by the ground current flow 32 would be essentially zero at the location of the sensor tool 20, in the absence of the target well 10. However, the high electrical conductivity of the well casing 12, or a drill string or other long metallic conductor in the target well, has a short-circuiting effect on the ground current and concentrates a significant portion of that current in the casing 12. The alternating target well current I produced by current 32 is indicated by arrows 34 in FIG. 1. This target well current produces an alternating magnetic field H, indicated by field line 36, the magnetic field lines lying in planes perpendicular to the axis of the target well.

As more clearly illustrated in FIG. 2, the magnetic field line 36, which is representative of the multiple field lines produced by the current flow in the target well, is essentially circular with its axis lying along the axis of the target well, or very close thereto. If the relief well is being drilled directly toward the target well; that is, is on target, so that the projected path 40 of the relief well will intersect the target well 10, the magnetic field H represented by line 36 will be perpendicular to the axis of the relief well, which lies on a projection of line 40. On the other hand, if the relief well 16 is off target, that is, is on a projected path 42 which will not intersect with the target well 10, as illustrated in FIGS. 3 and 4, the magnetic field H represented by line 36 will not be perpendicular to the axis of the relief well, but will be at an angle thereto.

More particularly, when the relief well is on path 40 (FIG. 2) the magnetic field H at the end of the relief well, and thus at the sensor tool 20, will be perpendicular to the axis of the relief well, as illustrated by line 44, and as a result there will be no component of the magnetic field in the direction of the relief well axis. However, in the case where the relief well is not on target, as shown in FIGS. 3 and 4, the magnetic field H at the end of relief well 16, as indicated by line 46, will be at an angle D with respect to the line 44 (which is perpendicular to the axis of well 16) and thus the magnetic field will have a component perpendicular to the axis of the relief well, as indicated by vector line 48, and a component parallel to the axis of the relief well, as illustrated by vector line 50. The component lying along line 50, indicated as Ha in FIGS. 3 and 4, is proportional to angle D and thus is proportional to the deviation of the relief well from the target well in a horizontal plane. Accordingly, a measurement of the magnitude and phase or sign of Ha will provide an indication of the angle of deviation, and of whether the target well lies to the right or to the left of the course of the relief well.

As illustrated, the distance between the target well 10 and the end of the relief well 16 is indicated by the vector R, illustrated by line 52 in FIGS. 3 and 4. The magnitude and direction of the magnetic field at any point along the magnetic field line 36 is illustrated by the vector H (line 46) which is tangential to the circle defined by line 36 and is perpendicular to R. As shown in FIG. 2, when R coincides with the path 40 of the relief well, the vector H is then perpendicular to the axis of the relief well and there is no net magnetic field along the relief well axis. However, when the relief well deviates to one side or the other of the target well, then H is no longer perpendicular to the axis of the relief well, and an axial component Ha appears.

It will be understood that the illustration of FIGS. 3 and 4 shows a relief well deviating to the right of the target well, as viewed from the relief well, and further represents a current flow downwardly in the target well, as illustrated by arrows 34. Since the target current 34 is alternating, the magnetic field represented by line 36 also is alternating, but this does not affect the measurements obtained by the present method. Further, if the relief well deviates from the target in the opposite direction; i.e. to the left as viewed from the relief well, the phase relationship between the measured vector Ha and the current 34 will reverse, but the magnitudes will remain the same. This phase reversal, however, provides a positive indication of the direction of the deviation and thus provides guidance to the driller as to whether to turn the relief well to the left or to the right to intersect the target.

The alternating axial magnetic field component Ha is given by:

$$Ha = I \cdot \mathrm{Sin}\, D / 2\pi R. \qquad (1)$$

The foregoing equation applies where the path of the relief well is essentially perpendicular to the axis of the target well, as viewed in a vertical plane such as that illustrated in FIG. 1, when the angle 18 is essentially a right angle.

In the case where the relief well is not substantially perpendicular to the axis of the target well, as illustrated at 16' in FIG. 3, and wherein the projected path 56 of the well approaches at an angle 58, and does not intersect with the target well 10, the axial field Ha in the relief well may be computed as follows:

$$Ha = \frac{I \cdot \mathrm{Sin}(D) \cdot \mathrm{Sin}(TH)}{2\pi R} \qquad (2)$$

where the angle TH is the angle between the relief well 16' and a vertical line 60. If the target well 10 is also vertical, then angle TH is the same as angle 58.

The axial component Ha of the magnetic field is measured by the homing tool 20 through the use of a highly sensitive magnetic field sensor such as that illustrated at 70 in FIG. 5. The homing tool sensor, in one embodiment, is a fluxgate magnetometer having a ring core 72 and a surrounding toroidal excitation winding 74. The ring core and excitation winding are surrounded by a sensor coil 76, in known manner. The sensor 70 is mounted within the sensor tool 20 so that the windings 76 are perpendicular to the axis of the sensor, thereby mounting the magnetometer 70 with its axis of maximum sensitivity, indicated at 78, in alignment with the axis of the sensor tool. Although the sensor 70 is illustrated as being a ring-type magnetometer, various other configurations may be used, as long as they provide the required degree of sensitivity. The sensor tool is capable of measuring the axial component of any magnetic field to which it is exposed, and is thereby capable of measuring the component Ha in a relief well.

In operation, as the relief well 16 is drilled toward the target well 10, conventional well logging techniques are used until the relief well reaches a location within 150 to 200 feet of the target well, with the relief well approaching the target at an angle of approach 18 which is relatively large; i.e. in the range of 60° to 90°. At this point, the well homing tool 20 is inserted in the relief well and an A.C. current at a relatively low frequency is supplied to the electrodes 26 and 28 to produce the required current flow 34 in the target well. This produces an A.C. magnetic field such as that illustrated at 36 in the vicinity of the sensor tool. If the path of the relief well is such that it will intersect the target, in the manner illustrated in FIG. 2, then the magnetic field 36 will be perpendicular to the axis of maximum sensitivity of the magnetometer 70, and the magnetometer will produce no output. This will indicate to the driller that the relief well is on target.

If the path of the relief well is non-intersecting, so that the relief well would pass by the target well to one side or the other, then the magnetic field in the vicinity of the sensor 70 will have a component which is parallel to the axis 78 of maximum sensitivity of the sensor. This component is indicated at Ha in FIG. 4 and produces a corresponding output signal from the sensor coil 76. Since the current flow I on the target well can be determined with a relatively high degree of accuracy, the value of the angle D can be calculated from equation (1), also with a high degree of accuracy because of the sensitivity of magnetometer 70. The magnitude of the value of angle D provides the driller with the information required to change its direction so as to intersect with the target well and, in addition, provides information as to the magnitude of the vector R, and thus of the distance between the relief well and the target well. The direction of angle D will depend upon the phase relationship between the measured value Ha and the current I flowing in the target well, the value Ha being in phase when the deviation is to one side of the relief well and 180° out of phase when the deviation is to the other side of the target well. For relatively large angles, the calculations are made by the use of $Ha = I \cdot \mathrm{Sin}\, D / 2\pi R$, while for smaller angles, $$Ha = \frac{\mathrm{Sin}(D) \cdot \mathrm{Sin}(TH)}{2\pi R}$$

is more accurate.

The information derived from a measurement of the value Ha and calculations of angle D and distance R provide a measure of the direction and distance from the relief well to the target well. This information is used by the driller to correct the direction of the relief well and, after further drilling, the measurement is repeated so that the relief well is accurately and quickly directed to an intersection with the target well.

Although the foregoing measurements assume that the target well and the relief well are both straight lines and that the target well is essentially vertical, the measurements provide an accurate and reliable direction to the driller even if the wells are not quite straight and are not quite vertical. It is further noted that the measurements are made without the need for orienting the sensor within the relief well so that it is not necessary to measure either the earth's magnetic field or gravity; only a single measurement of the magnitude of the actual component of the magnetic field produced by the current flowing in the target well is required.

Figure 7:
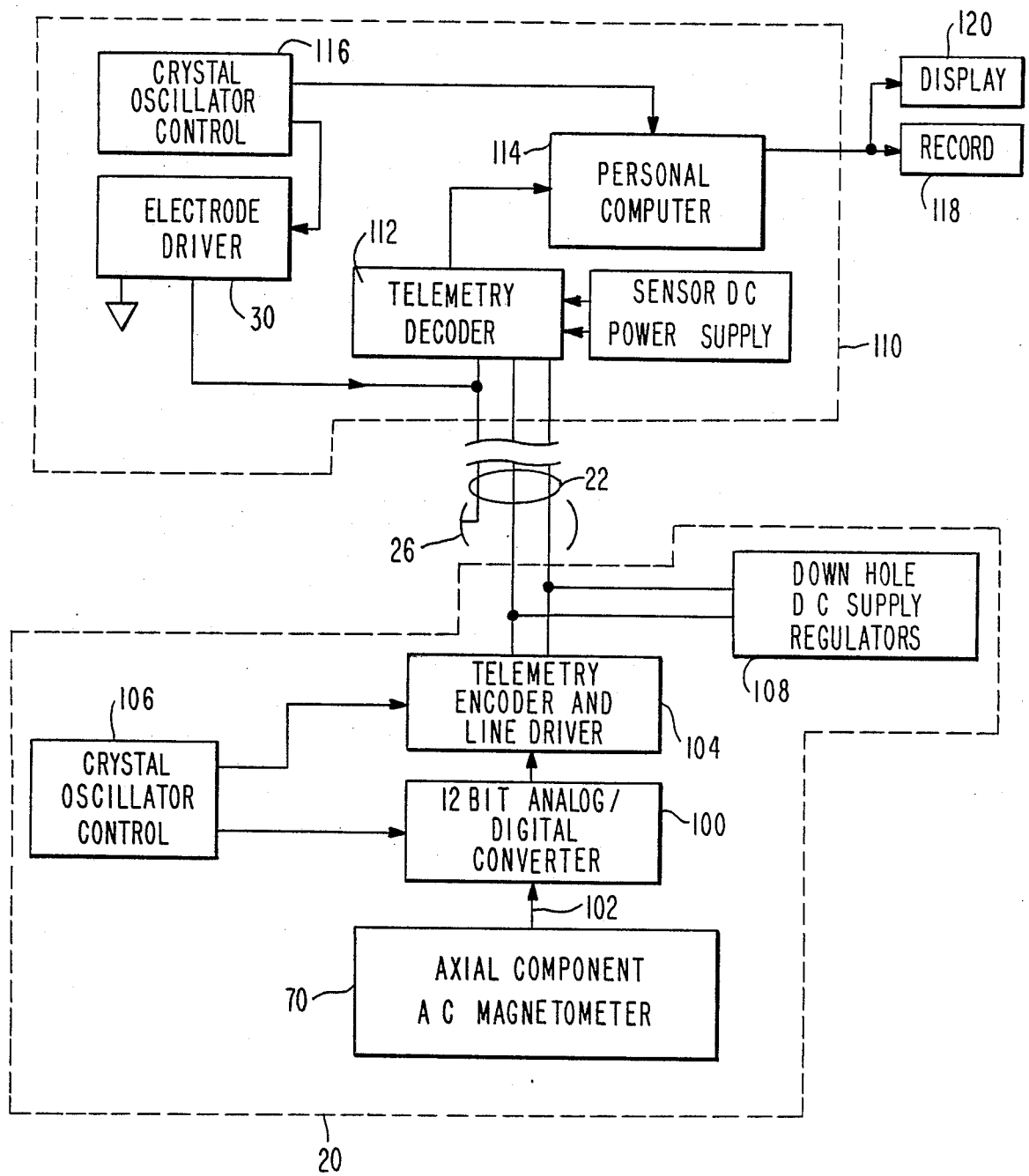
FIG. 7 is a diagrammatic illustration of the electrical circuitry for receiving the signals detected by the sensor device utilized in the preceding figures.

It will be understood that the current flow in the target well can be generated by either down-hole electrodes of the type illustrated in FIG. 1, or by surface electrodes such as the electrodes 80, 82 and 84 shown in FIG. 7 as being located at the surface 86 of the earth. Electrode 80 is connected to one side of an alternating current source 88, while the electrodes 82 and 84 are connected to the other side of the A.C. source. Electrode 80 is preferably located near the well head 90 of the target well, with electrode 82 being located near the well head 92 of the relief well. Electrode 84 is located diametrically opposite to electrode 82 from electrode 80 to provide a symmetrical current flow in the ground. This arrangement is advantageous for very shallow points of intersection, where a wire line electrode might not be sufficiently dee to provide the required symmetrical electrical current flow around the target well and in the vicinity of the sensor homing tool. It will be understood that various other electrode configurations may be used so long as the ground currents produced thereby do not generate a magnetic field in the relief well.

The circuitry for controlling the sensor 70 and for receiving the signals representing the measurement of the value Ha is illustrated in FIG. 7, and is essentially the same as that described with respect to the system of U.S. Pat. No. 4,372,398. Thus, the homing tool 20 includes an analog digital converter 100 which receives, by way of line 102, signals from the sensor winding 76 of the magnetometer 70, converts the signals to a digital form, and transfers them by way of suitable telemetry circuitry 104 to the surface equipment by way of wire lines 22. A suitable crystal oscillator circuit 106 and suitable D.C. supply voltage regulators 108 are provided in the homing tool 20 to operate the A-to-D converter and the telemetry circuit, as well as to provide the required excitation signals to the sensor 70.

Suitable surface equipment, generally indicated at 110, receives the signals from the down-hole telemetry, and feeds these signals through a suitable decoder 112 to a personal computer 114 for recording the data and performing the required calculations. The surface equipment includes the A.C. source 30 which feeds ground current to the electrode 26, and also includes a suitable power supply for the down-hole equipment. As illustrated, a crystal oscillator 116 synchronizes the A.C. driver 30 and the personal computer 114 to permit detection of the phase relationship between the current flow in the target well and the vector quantity Ha to thereby determine which direction the relief well should be turned in order to intersect the target well. The data received at the computer 114 are recorded and a suitable display may be provided for the results of the calculation on the recording and display devices 118 and 120, respectively.

Although the present invention has been described in terms of a preferred embodiment, it will be apparent that numerous variations and modifications may be made without departing from the true spirit and scope thereof as set forth in the following claims.

What is claimed is:

1. A method of locating, from a homing tool location, the direction to a target underground location, comprising:

drilling a borehole at a location spaced from a target underground location;

lowering into said borehole a homing tool having a longitudinal axis which is aligned with the axis of said borehole and incorporating a magnetic field sensor having an axis of maximum sensitivity aligned with said homing tool axis;

producing a time-varying current flow on the target which provides a corresponding time-varying magnetic field at the homing tool location in said partially drilled borehole;

measuring, by means of said magnetic field sensor, the component of said time-varying magnetic field which is parallel to said homing tool axis; and determining from said measured time-varying magnetic field component the direction to the target location from said borehole.

2. The method of claim 1, further including:
determining the phase of said measured time-varying magnetic field component with respect to said time-varying current flow at the target for use in determining the direction of the target location from said borehole.

3. The method of claim 2, further including:
obtaining survey data providing the inclination and direction of said borehole; and
determining from said measured component of said time-varying magnetic field and said survey data the distance between said partially drilled borehole and the target location.

4. The method of claim 3, further including:
additionally drilling said borehole in accordance with the distance and direction determinations made from said measured component of said time-varying magnetic field to intersect the target.

5. The method of claim 4, wherein the step of drilling said borehole includes drilling said borehole at a large angle of approach to the target.

6. The method of claim 1, further including:
measuring the downward inclination of said borehole with respect to vertical; and
modifying said measured component of said time-varying magnetic field in accordance with the angle of said downward inclination.

7. A method of locating from a relief borehole the direction to a target well which is to be intersected by the relief well, comprising:
drilling a relief borehole at a location spaced from a generally vertical target well, said relief borehole being directed generally horizontally toward the target well to intersect therewith at a large angle of intersection;
lowering into said relief borehole a homing tool having a longitudinal axis which is aligned with the longitudinal axis of said relief borehole, said homing tool incorporating a single magnetic field sensor having an axis of maximum sensitivity aligned with said homing tool axis;
injecting a time-varying current into the earth surrounding the target well to produce in the target well a time-varying current I which provides a corresponding time-varying magnetic field H which is generally horizontal at the homing tool location in the partially drilled relief borehole;
measuring by said magnetic field sensor, the component Ha of said time-varying magnetic field which is parallel to said homing tool axis;
determining the phase relationship between said measured component H a and said time-varying current I;
determining from the magnitude of said meaured component Ha of said time-varying magnetic field the angle D between the longitudinal axis of said homing tool and the target well in accordance with the relationship $Ha = I \cdot \sin D / 2\pi R$, where r is the vectorial distance betwenen the target well and the homing tool;
determining from said phase relationship whether the angle D is to one side or the other of said relief borehole;
continuing the drilling of said relief well in accordance with the determination of said angle D and said phase relationship.

* * * * *